United States Patent
Lokio

(10) Patent No.: US 6,272,355 B1
(45) Date of Patent: *Aug. 7, 2001

(54) POWER CONTROL METHOD AND CELLULAR RADIO SYSTEM

(75) Inventor: Jouko Lokio, Oulu (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,350

(22) PCT Filed: Aug. 27, 1997

(86) PCT No.: PCT/FI97/00492

§ 371 Date: Apr. 28, 1998

§ 102(e) Date: Apr. 28, 1998

(87) PCT Pub. No.: WO98/09384

PCT Pub. Date: Mar. 5, 1998

(30) Foreign Application Priority Data

Aug. 28, 1996 (FI) .................................................. 963357

(51) Int. Cl.⁷ .............................. H04B 7/00; H04B 1/00; H04B 17/00; H04Q 7/20; H03C 1/62
(52) U.S. Cl. .............................. 455/522; 455/69; 455/115
(58) Field of Search .................................. 455/522, 422, 455/69, 115, 507, 517, 524, 62, 70, 575; 370/335, 327, 329, 342, 320

(56) References Cited

U.S. PATENT DOCUMENTS

| | | | |
|---|---|---|---|
| 5,574,984 | * 11/1996 | Reed et al. | 455/69 |
| 5,771,461 | * 6/1998 | Love et al. | 455/522 |
| 5,862,453 | * 1/1999 | Love et al. | 455/69 |
| 5,924,043 | * 7/1999 | Takano | 455/522 |
| 5,963,870 | * 10/1999 | Chheda et al. | 455/522 |
| 6,035,209 | * 3/2000 | Tiedmann et al. | 455/522 |

FOREIGN PATENT DOCUMENTS

| | | |
|---|---|---|
| 0 718 985 | 6/1996 | (EP). |
| 92/06544 | 4/1992 | (WO). |
| 94/18756 | 8/1994 | (WO). |
| 95/05705 | 2/1995 | (WO). |
| 96/31014 | 10/1996 | (WO). |

* cited by examiner

Primary Examiner—Nay Maung
Assistant Examiner—Raymond Persino
(74) Attorney, Agent, or Firm—Pillsbury Winthrop LLP

(57) ABSTRACT

The invention relates to a power control method and a cellular radio system used for power control, comprises at least one subscriber terminal, one base station and means for changing the step size to be used for power control. The means receive information on the speed of the subscriber terminal and the cellular radio system uses a fading channel. The means change the step size to be used for power control on the basis of the information on hte speed of the subscriber terminal for diminishing fading in the channel.

11 Claims, 1 Drawing Sheet

POWER CONTROL METHOD AND CELLULAR RADIO SYSTEM

This application is the national phase of international application PCT/FI97/00492 filed Aug. 27, 1997 which designated the U.S.

FIELD OF TECHNIQUE

The invention relates to a power control method used for changing step size of power control in a cellular radio system, comprising at least one subscriber terminal and one base station, receiving information on the speed of the subscriber terminal and using a fading channel.

The invention relates further to a cellular radio system used for power control and comprising at least one subscriber terminal, one base station and means for changing step size of power control, which means receive information on the speed of the subscriber terminal and which cellular radio system uses a fading channel.

PRIOR ART

In a cellular radio system, the quality of a connection between a base station and a subscriber terminal varies continuously. This variation is due to disturbing factors on the radio path and, for instance, to an attenuation of radio waves as a function of distance. The reception of the subscriber terminal is disturbed also by signals coming from base stations located within the coverage area and serving other subscriber terminals.

In a cellular network environment, users are located randomly with respect to the base station and each other. Attenuation of a signal between a base station and a subscriber terminal is described by part loss, increasing at least quadratically with increasing distance. Therefore, subscriber terminals located close to the base station may cover a transmission of more distant base stations entirely, especially when the power control of the subscriber terminals is not accurate, because even a small correlation of a strong signal may cause a great interference to the indication of a weak signal. This phenomenon is called near/far problem. In a cellular radio system, power control aims at that the power received by the base station of all subscriber terminals shall be equal irrespective of the distance between the subscriber terminal and the base station. The power control also aims at that the subscriber terminal receives a signal of accepted level all the time when it is in contact with the base station. It is, however, difficult to carry out an accurate power control, e.g. because of the quickly varying nature of a radio channel.

Attenuation of the radio path between a base station and a subscriber terminal at a single point is not only a function of distance and frequency, for instance. In a received signal, fast and slow variation occur as a function of time and place. This signal variation is called signal fading.

Fast signal fading is due to the fact that signal components coming to a receiver different ways are summed together. Depending on mutual phase difference between the signal components, they either amplify or attenuate each other. The variation of the signal components may be significant, up to tens of decibels. Great variation occurs along a distance of less than half a wavelength already. On account of fast fading, the amplitude of a received signal follows so-called Rayleigh distribution. Fast fading may be e.g. flat or frequency-selective fading depending on the bandwidth of the signal.

Slow fading of a signal is due to the fact that, on the radio path between the base station and the subscriber terminal, there is a varying amount of obstacles causing extra attenuation. Obstacles can be house walls or high terrain forms, for instance. Slow fading follows typically lognormal distribution. The average signal level in decibels received in the lognormal distribution is normally distributed. In cellular radio systems, signal variations caused by fast and slow fading are taken into consideration by increasing the transmission power or, respectively, by shortening the radio path in such a way that the received signal power is in certain probability above the threshold power of the receiver.

It is previously known to use power control in subscriber terminals to decrease signal variation caused by fading. In general, power has been controlled by a standard step size. The base station or the subscriber terminal has measured the signal and transmitted power control commands on the basis of this measurement. The power control commands have been commands to decrease or increase the transmission power, for instance. The step size of power control has been changeable, too. The variation in the step size has been dependent on the load of the base station or on previous power control commands, for instance.

However, it has not been possible to achieve an accurate power control by the known power control methods so that fading occurring in the channel could have been decreased sufficiently. These solutions have not considered the change in fading profile caused by a movement of the subscriber terminal. As the step size used for power control in the known methods has been selected some compromise value, which has not been especially good at any speed of the subscriber terminal. Consequently, the step size has worked at all speeds of the subscriber terminal, but it has not been anywhere near ideal at any speed. Due to the above, the known power control methods have not been capable of following separate fading notches in the fading profile efficiently, which notches have occurred in the radio channel.

When the subscriber terminal has moved very slowly or stayed in place, the step size of power control used in the known solutions has usually been too big. By too big a step size of power control, it has not been possible to adapt the ideal power control efficiently and accurately enough. With increasing speed of the subscriber terminal, the step size to be used for power control has usually become too small for being capable of following efficiently fast fading, in particular. If the speed of the subscriber terminal has grown even higher, the known power control methods have not been capable of following separate fading notches any more. Moreover, it is not possible to follow said fading notches, because the frequency of occurrence of fading notches has been much greater than the possibility of transmitting power control commands, for instance. The power level received in this situation has averaged the fading channel at the fading notches and the power control used has followed slow fading, primarily.

FEATURES OF THE INVENTION

An object of the present invention is to implement a solution according to which the step size to be used for power control is provided in such a way that the power control compensates for fadings occurring in the channel.

This is achieved by a method of the type described in the introduction, characterized in that the step size is changed on the basis of the information on the speed of the subscriber terminal for diminishing fadings in the channel.

The cellular radio system according to the invention is characterized in that the means change the step size to be used for power control on the basis of the information on the speed of the subscriber terminal for diminishing fadings in the channel.

Considerable advantages are achieved by the method of the invention. The step size to be used for power control in a cellular radio system according to the invention is determined in such a way that the speed of the subscriber terminal is taken into consideration. In this way, the power control will be accurate. Simultaneously, the quality and the safety of a connection between the base station and the subscriber terminal of the cellular radio system will be better. Accordingly, the solution of the invention is capable of following the ideal power control better and diminishing the channel fading on the radio path, because the step size to be used for power control is changed on the basis of the speed information received from the cellular radio system.

Preferred embodiments of the method according to the invention appear also from the attached dependent claims and preferred embodiments of the receiver according to the invention appear from the attached dependent claims.

DESCRIPTION OF FIGURES.

In the following, the invention is explained in more detail with reference to the examples according to the attached drawings, in which.

DESCRIPTION OF PREFERRED EMBODIMENTS

Figure 1:
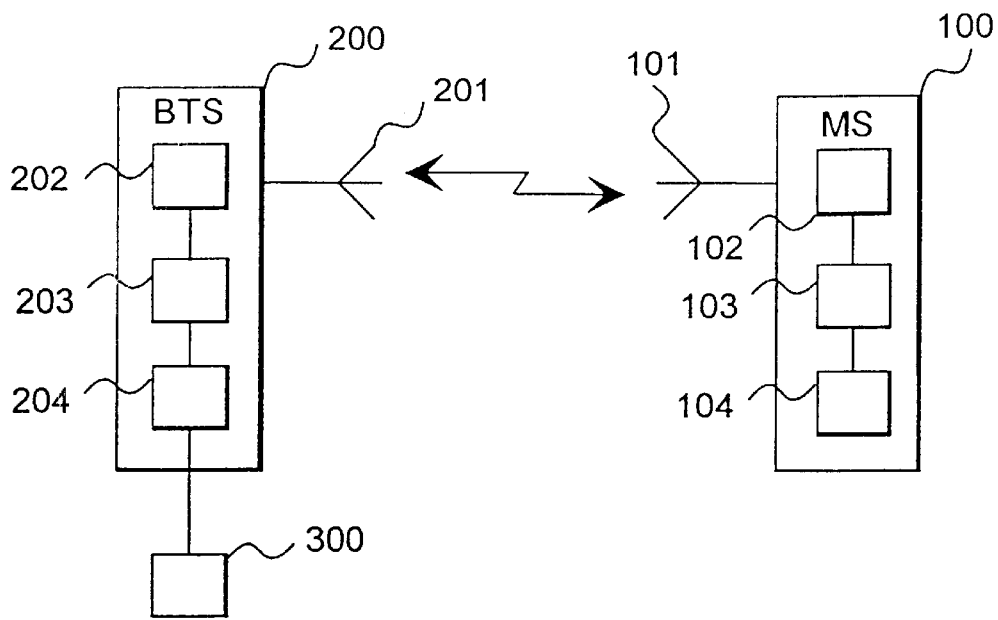
FIG. 1 shows a cellular radio system according to the invention.

FIG. 1 shows a cellular radio system using the solution according to the invention. The solution of the invention is suitable for use in cellular radio systems based on CDMA technique (Carrier Division Multiple Access), in particular. The cellular radio system of the figure comprises a subscriber terminal 100, a base station 200 and means 300. In the solution of the figure, the means 300 are connected to the base station 200. The subscriber terminal 100 is connected to the base station 200 and the subscriber terminal 100 moves within the range of separate cells of the cellular radio system at a variable speed.

The subscriber terminal 100 comprises an antenna 101, radio frequency parts 102, D/A and A/D converter parts 103 and modulation parts 104. The antenna 101 works normally as a transceiver antenna. The subscriber terminal 100 receives by the antenna 101 a signal transmitted by the base station 200, which signal is applied to the radio frequency parts 102. The radio-frequency analog signal is transferred to an intermediate frequency and filtered. In receiving direction, the modulation parts 104 reset the broadband signal to a narrowband data signal.

The base station 200 comprises an antenna 201, radio frequency parts 202, D/A and A/D converter parts 203 and modulation parts 204. The antenna 201 works normally as a transceiver antenna. The base station 200 receives by the antenna 201 a signal, which is applied to the radio frequency parts 202. The radio-frequency analog signal is transferred to an intermediate frequency and filtered. Subsequently, the signal is applied to the A/D converter parts 203, where the analog signal is converted into a digital one. In receiving direction, the modulation parts 204 reset the broadband signal to a narrow-band data signal.

In transmitting direction, the digital signal is D/A-converted into an analog signal. Subsequently, the analog signal is quasi-noise coded into a broadband spread spectrum signal in the modulation parts 204. The obtained spread spectrum signal is converted to the radio frequency in the radio frequency parts 202 according to the prior art and transmitted via the antenna 201 to the radio path. The means 300 connected to the base station 200 change the step size to be used for power control in the cellular radio system.

Initially, it is assumed that the subscriber terminal 100 moves very slowly or it stays in place within the range of the cellular radio system. The means 300 measure a signal transmitted by the subscriber terminal 100, from which signal the means 300 produce a measurement information proportional to the speed of movement of the subscriber terminal 100. The information produced by the means 300 can be based on a measurement information obtained from measuring the Doppler effect, for instance. Because the subscriber terminal 100 moves very slowly, the means 300 change the step size of power control to small. On the basis of the measurement data, the step size is changed to be so small that the power control follows the ideal power control as accurately as possible.

If the speed of movement of the subscriber terminal 100 increases, the means 300 detect the change in speed. The means 300 increase the step size of power control in the above situation. Increasing the step size is based on the means 300 measuring a signal transmitted by the subscriber terminal 100. By increased step size, the power control may follow fadings on the radio path, i.e. in the channel, between the base station 200 and the subscriber terminal 100. Because the degree of increasing the step size is based on how high the speed of movement of the subscriber terminal 100 is, fadings may be followed by the solution of the invention at higher speeds of movement of the subscriber terminal 100 than what is possible when a standard step size is used.

If the speed of the subscriber terminal 100 still increases, more fadings begin to occur in the channel. Then separate fadings cannot be followed successfully any longer by increasing the step size, but the step size is made smaller. After the step size has been made smaller, the power control follows slow fading, in particular, more efficiently again. Additionally, the step size to be used for power control can be determined also based on other parameters of the cellular radio system than on the speed of movement of the subscriber terminal 100.

Upon receiving the information on the speed of movement of the subscriber terminal 100, the means 300 change the step size to be used for power control in the cellular radio system. The means 300 change the step size of power control used by the subscriber terminal 100 for transmitting a signal, for instance. The means 300 also change the step size of power control used by the base station 200 of the cellular radio system for transmitting a signal. Because it is possible to change the step size of power control of the base station 200 and that of the subscriber terminal 100 separately, the solution according to the invention provides an efficient and accurate power control for the cellular radio system.

Figure 2:
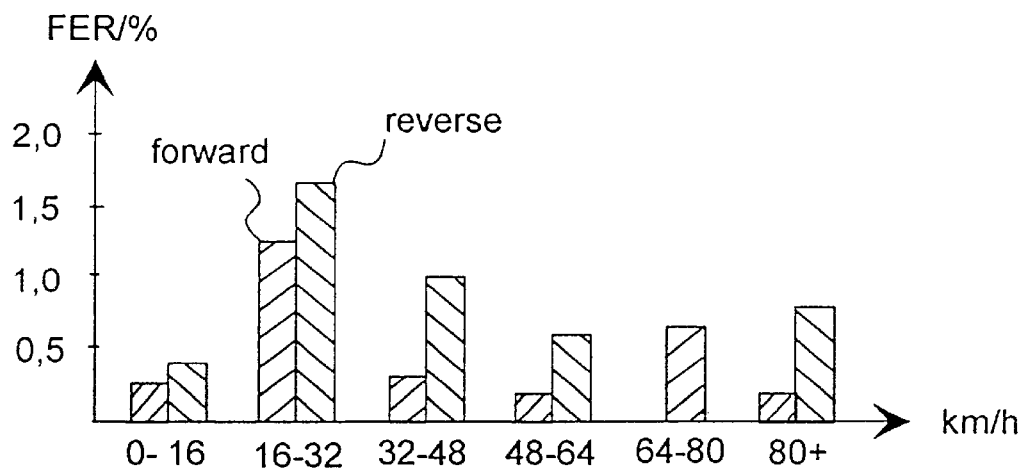
FIG. 2 shows prior art technique in power control by using a change in frame error rate of a received signal as a function of the speed of a subscriber terminal and FIG. 3 shows a power control step size changing according to the speed of the subscriber terminal by using a change in frame error rate of the received signal as a function of the speed of the subscriber terminal.

FIG. 2 shows a change in the Frame Error Rate (FER) of a signal generated by a method according to the prior art as a function of the speed of the subscriber terminal 100. Power control according to the prior art generally uses a standard step size. From the figure is seen that a forward connection, i.e. a connection from the subscriber terminal 100 to the base station 200, has a lower frame error rate at each speed of movement of the subscriber terminal 100 than a reverse connection. Reverse connection signifies in this case a transfer direction from the base station 200 to the subscriber terminal 100. In the case of the figure, the maximum frame error rate has been provided within the speed range of 16 to 32 km/h.

Figure 3:
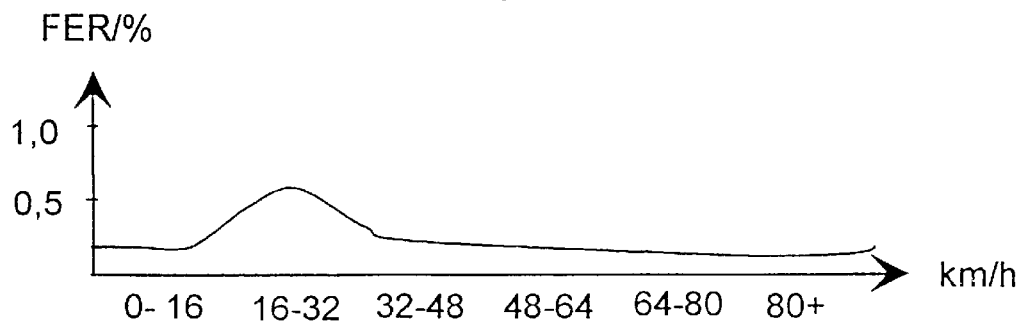

FIG. 3 shows a change in the frame error rate of a signal generated by the method according to the invention as a function of the speed of the subscriber terminal 100. The method of the invention uses a step size of power control proportional to the speed of movement of the subscriber terminal 100. Also in this case, the maximum frame error rate has been achieved within the speed range of 16 to 32 km/h. However, from the figure is seen clearly that the method of the invention provides a frame error rate figure considerably lower than the solution according to the prior art, at all values of the speed of movement of the subscriber terminal 100. Accordingly, the solution according to the invention is capable of diminishing fadings occurring in the channel on the radio path of the cellular radio system and compensating for them considerably more than the prior art solutions.

Though the invention has been described above with reference to the example according to the attached drawings, it is obvious that the invention is not restricted to that, but it can be modified in many ways within the inventive idea set forth in the attached claims.

What is claimed is:

1. A method for changing a step size of power control in a cellular radio system including at least one subscriber terminal and one base station, said method comprising:

receiving information of a speed of the at least one subscriber terminal and use of a fading channel; and using and changing the step size of power control based on the speed of the at least one subscriber terminal to control power of the at least one subscriber terminal or the base station, wherein the step size of power control is increased with increasing speed of the at least one subscriber terminal.

2. A method for changing a step size of power control in a cellular radio system including at least one subscriber terminal and one base station, said method comprising:

receiving information of a speed of the at least one subscriber terminal and use of a fading channel; and using and changing the step size of power control based on the speed of the at least one subscriber terminal to control power of the at least one subscriber terminal or the base station, wherein the step size of power control is decreased with decreasing speed of the at least one subscriber terminal.

3. A cellular radio system used for power control, the cellular radio system being arranged to use a fading channel, the cellular radio system comprising:

at least one subscriber terminal:

a base station; and means for determining and changing a step size of power control to control power of the at least one subscriber terminal or the base station, said means for determining and changing the step size of power control is arranged to receive information of a speed of the at least one subscriber terminal, and said means for determining and changing the step size of power control is arranged to determine the step size of power control to be used for the power control of the at least one subscriber terminal or the base station based on the speed of the at least one subscriber terminal, wherein said means for determining and changing the step size of power control is arranged to increase the step size of power control with increasing speed of the at least one subscriber terminal.

4. A cellular radio system used for power control, the cellular radio system being arranged to use a fading channel, the cellular radio system comprising:

at least one subscriber terminal;

a base station; and means for determining and changing a step size of power control to control power of the at least one subscriber terminal or the base station, said means for determining and changing the step size of power control is arranged to receive information of a speed of the at least one subscriber terminal, and said means for determining and changing the step size of power control is arranged to determine the step size of power control to be used for the power control of the base station or the at least one subscriber terminal based on the speed of the at least one subscriber terminal and in that the means, wherein said means for determining and changing the step size of power control is arranged to decrease the step size of power control with decreasing speed of the at least one subscriber terminal.

5. A cellular radio system used for power control, the cellular radio system being arranged to use a fading channel, the cellular radio system comprising:

at least one subscriber terminal;

a base station; and means for determining and changing a step size of power control to control power of the base station, said means for determining and changing the step size of power control is arranged to receive information of a speed of the at least one subscriber terminal, and said means for determining and changing the step size of power control is arranged to determine the step size of power control to be used for the power control of the base station based on the speed of the at least one subscriber terminal, wherein said means for determining and changing the step size of power control is arranged to decrease the step size of power control with decreasing speed of the at least one subscriber terminal, wherein when a fading in a separate channel of the at least one subscriber terminal or the base station inhibits the use of the fading channel, then the step size of power control is decreased until the power control again diminishes fadings in the fading channel.

6. A cellular radio system to be used for power control, the cellular radio system being arranged to use a fading channel, the cellular radio system comprising:

at least one subscriber terminal;

a base station; and means for determining and changing a step size to be used for power control of the at least one subscriber terminal, said means for determining and changing the step size to be used for power control is arranged to receive information of a speed of the at least one subscriber terminal, and said means for determining and changing the step size is arranged to determine the step size to be used for the power control of the at least one subscriber terminal based on the speed of the at least one subscriber terminal, wherein said means for determining and changing the step size to be used for power control is arranged to decrease the step size to be used for power control of the at least one subscriber terminal with decreasing speed of the at least one subscriber terminal.

7. A cellular radio system to be used for power control, the cellular radio system being arranged to use a fading channel, the cellular radio system comprising:

at least one subscriber terminal;

a base station; and means for determining and changing a step size to be used for power control of the base station, said means for determining and changing the step size to be used for power control is arranged to receive information of a speed of the at least one subscriber terminal, and said means for determining and changing the step size is arranged to determine the step size to be used for the power control of the base station based on the speed of the at least subscriber terminal, wherein said means for determining and changing the step size to be used for power control is arranged to decrease the step size to be used for power control of the base station with decreasing speed of the at least one subscriber terminal.

8. A method for changing a step size of power control in a cellular radio system including at least one subscriber terminal and one base station, said method comprising:

receiving information of a speed of the at least one subscriber terminal and use of a fading channel; and using and changing the step size of power control based on the speed of the at least one subscriber terminal to control power of the at least one subscriber terminal or the base station;

wherein the step size of power control is decreased with increasing speed of the at least one subscriber terminal.

9. A method for changing a step size of power control in a cellular radio system including at least one subscriber terminal and one base station, said method comprising:

receiving information of a speed of the at least one subscriber terminal and use of a fading channel; and using and changing the step size of power control based on the speed of the at least one subscriber terminal to control power of the at least one subscriber terminal or the base station;

wherein the step size of power control is increased with decreasing speed of the at least one subscriber terminal.

10. A cellular radio system used for power control, the cellular radio system being arranged to use a fading channel, the cellular radio system comprising:

at least one subscriber terminal;

a base station; and means for determining and changing a step size of power control to control power of the at least one subscriber terminal or the base station, said means for determining and changing the step size of power control is arranged to receive information of a speed of the at least one subscriber terminal, and said means for determining and changing the step size of power control is arranged to determine the step size of power control to be used for the power control of the at least one subscriber terminal or the base station based on the speed of the at least one subscriber terminal;

wherein said means for determining and changing the step size of power control is arranged to decrease the step size of power control with increasing speed of the at least one subscriber terminal.

11. A cellular radio system used for power control, the cellular radio system being arranged to use a fading channel, the cellular radio system comprising:

at least one subscriber terminal;

a base station; and means for determining and changing a step size of power control to control power of the at least one subscriber terminal or the base station, said means for determining and changing the step size of power control is arranged to receive information of a speed of the at least one subscriber terminal, and said means for determining and changing the step size of power control is arranged to determine the step size of power control to be used for the power control of the at least one subscriber terminal or the base station based on the speed of the at least one subscriber terminal;

wherein said means for determining and changing the step size of power control is arranged to increase the step size of power control with decreasing speed of the at least one subscriber terminal.

* * * * *